United States Patent [19]

Dashwood

[11] Patent Number: 4,803,608
[45] Date of Patent: Feb. 7, 1989

[54] REAR LIGHTS FOR BICYCLES AND OTHER VEHICLES

[75] Inventor: Nigel J. R. Dashwood, Hertfordshire, England

[73] Assignee: Duracell Inc., Bethel, Conn.

[21] Appl. No.: 944,151

[22] Filed: Dec. 18, 1986

[30] Foreign Application Priority Data

Dec. 19, 1985 [GB] United Kingdom ............... 8531275

[51] Int. Cl.[4] ............................................. F21V 33/00
[52] U.S. Cl. ........................... 362/72; 362/309; 362/326; 362/339
[58] Field of Search ............... 362/61, 80, 72, 326, 362/332, 333, 339, 308, 309

[56] References Cited

U.S. PATENT DOCUMENTS

| | | | |
|---|---|---|---|
| 1,676,464 | 7/1928 | Ryan | 362/309 |
| 3,251,987 | 5/1966 | Wince | 362/339 |
| 4,118,763 | 10/1978 | Osteen | 362/339 |
| 4,559,589 | 12/1985 | Sassmannshausen | 362/72 |

FOREIGN PATENT DOCUMENTS

| | | | |
|---|---|---|---|
| 1125858 | 3/1962 | Fed. Rep. of Germany | 362/309 |
| 405208 | 11/1909 | France | 362/339 |
| 0039980 | 3/1979 | Japan | 362/309 |

Primary Examiner—Ira S. Lazarus
Assistant Examiner—D. M. Cox
Attorney, Agent, or Firm—Ronald S. Cornell; James B. McVeigh

[57] ABSTRACT

The invention provides a light comprising a lamp, a reflector or other means defining an optical axis close to which the major part of the emergent light is distributed and a lens system having one or more prisms formed on its nearer face to the lamp and adjacent an edge of the lens system arranged to trap light from the lamp and distribute it by total internal reflection through the material of said lens system so that it emerges from the edge at more than 100° to the optical axis.

4 Claims, 3 Drawing Sheets

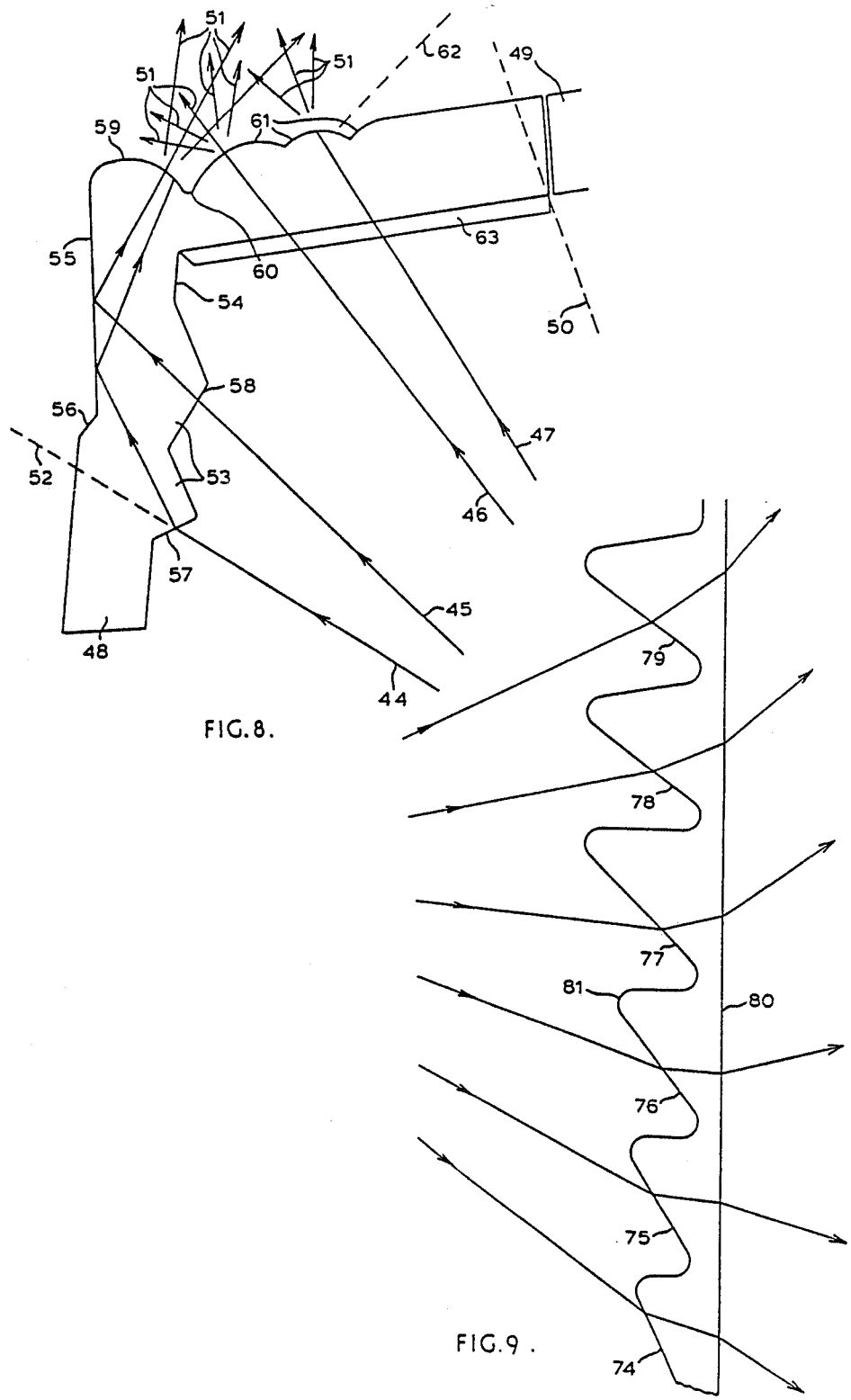

REAR LIGHTS FOR BICYCLES AND OTHER VEHICLES

FIELD OF THE INVENTION

The present invention is in the field of reflector design for bicycle lights and in particular bicycle rear lights which possess a rectangular or other non-circular front profile.

The present invention is also concerned with a light and more particularly, but not exclusively, with sections of a bicycle rear light having a lens that generates sidelight and/or top-light beams in order to meet the requirements of international lighting standards such as ISO 6742/1 and BS 3648.

BACKGROUND TO THE INVENTION

International lighting standards require rear bicycle lights to generate a wide angle horizontal beam of light with vertical coverage to make vehicles approaching from the rear or sides aware of the cyclist. At the extremes of the horizontal field the luminous intensities required by these standards are considerably lower than at beam centre but are still of great imoprtance from the point of view of safety. There is often a further requirement for red light to be emitted vertically upwards as a cone that extends in part towards the front of the cycle.

A great many cycle rear lights possess an overall rectangular cross-section, with the long side directed vertically, in which the reflector surrounding the light source has been truncated to the rectangular form of the light. Since it is almost universal for the reflectors to be of paraboloidal form this truncation results only in a loss of optical efficiency rather than a loss of angular coverage. With this type of reflector it is a requirement of the rear lens to extend the angular field sufficiently far to conform with the lighting standards.

In another type of cycle rear light the reflector is designed to contribute at least in part to the generation of the light beam angular distribution rather than to act merely as a collector of light for subsequent angular redistribution by the rear lens. This approach leads to a cycle light which has similar visual properties to a motor car rear light without the very high, and unnecessary, centre field intensity exhibited by a number of cycle rear lights. Should the reflector of a cycle rear light of this latter type be truncated to a rectangular cross-section then there will be a loss of field distribution angle generated by the reflector.

Most commercially available cycle rear lights are designed with an essentially bowl-shaped rear lens moulding which, at least in part, allows the lamp filament to be directly visible at the extremes of horizontal field coverage and in the vertical field. Since the luminous intensity of the lamp is invariably greater than the far field luminous intensities at the extreme angles which are required by the lighting standards, direct viewing of the filament, usually by way of a truncated reflector and the lens moulding, is acceptable.

A second design of cycle rear light lens relies on refraction or reflection within the optical system of the light to generate the required field coverage. Care must be exercised in this approach so that areas of the required field coverage are not omitted or produced at too low a luminous intensity to reach the relevant lighting standards.

SUMMARY OF THE INVENTION

It is an object of the invention to produce a reflector for use in a cycle light, said reflector causing no reduction in the angular spread of light reflected from it when it is truncated to fit within a rectangular aperture.

It is a further object of the invention to produce a reflector for use in a cycle light, said reflector operating with a high efficiency at converting light from a light source into the required output light beam.

It is yet another object of the invention to produce an efficient cycle light with a substantially fully-illuminated rectangular cross-section which will provide the same angular field of light output in each of two orthogonal directions so that it may be mounted above a wheel or, after rotation through 90 degrees, adjacent to the wheel mounting forks. In practice the invention is applicable to almost all reflectors which are designed to deliver a significant field angle of light and which are truncated in cross-sectional profile in order to fit in the light housing.

It is a further object of the invention to provide in a rear cycle light means for distributing light forwards of the bicycle without introducing components additional to the lens system and without reducing the light efficiency.

In one aspect the invention provides a lamp having a light source, a reflector having a non-circular aperture and a light-distributing lens conforming to the reflector aperture, wherein the reflector has at least one outer section truncated to define the aperture and at least one inner section arranged so that the or each inner section is circularly symmetric about a common optical axis, and with the profiles of said sections arranged so that:

(a) at least one inner section which because it is non-paraboloidal generates a light beam with far field divergence; and (b) the sum angular far field coverage of the reflector is unaffected by removal of the truncated portions of the or each outer section.

The arrangement described above has the advantages (a) of providing a light that may be made rectangular in profile and that provides a uniform illumination, (b) of operating at a much higher optical efficiency than lights with conventional truncated reflectors because it enables greater "wrap around" the light source in a given space, and (c) that truncating the reflector causes no loss of the angular field coverage of the light beam from the reflector. The light may be made in any convenient aspect ratio and may be mounted with its longer dimension horizontal or vertical.

In another aspect of the invention provides a light comprising a lamp, a reflector or other means defining an optical axis close to which the major part of the emergent light is distributed and a prism and/or lens system formed on its nearer face to the lamp with one or more prisms adjacent an edge of the lens system arranged to trap light from the lamp and distribute it by total internal reflection through the material of said lens system so that it emerges from the edge at more than 100° to the optical axis.

One advantage of the present light is that it allows considerable design freedom for styling, matching to the front cycle light (which must have quite different light output requirements in order to meet international lighting standards), and optimising the optical performance. In particular, and unlike a conventional cycle rear light, the lamp does not have to be sited in such a position that its filament can be seen by uninterrupted viewing at all parts of the illuminated field. This advantage arises because the refraction or reflection imparted by the optical system acts so as to change the direction of the light leaving the lamp filament to illuminate a particular part of the field. Consequently, the cycle rear light main housing may be constructed of an optically opaque material without the need for a bulbous lens dome common to most types of cycle rear light. A second advantage of the invention is that the reflection and refraction imparted to the light from the lamp filament is carried out in such a way that the effects of dust, road grime and scratches do not unduly affect the long term light output level and distribution from the light.

DESCRIPTION OF PREFERRED FEATURES

Advantageously the lens has side flanges carrying refractive prismatic arrays that register with the truncations in the reflector and that serve to produce a lateral distribution of light.

Preferably the reflecting prisms that are formed at the ends of the lens system are arranged to trap direct light from the lamp filament and the minimum angle of incidence $i_{min}$ of direct light from the lamp filament on the face of the or each prism at which said direct light is refracted into said material is given by:

$$\text{Sin } i_{min} = n \sin [\phi_c - \theta]$$

where n is the refractive index of said material, $\phi_c$ is the critical angle for total internal reflection and $\theta$ is the angle between the incident face and the face at which total internal reflection occurs.

The lens system may be cylindrically convex over its major part when viewed from in front of the light and an edge region bounding said major part is formed with scarp and dip faces meeting at an obtuse angulation, the dip face receiving the incident totally internally reflected light. The edge at which light emerges is conveniently of convex profile so that light emerges at a range of angles. The lens system may then be rearwardly flanged adjacent the edge at which said light emerges and said flange carries cylinder or spherical lens means that receive direct light from the lamp and distribute it over a range of angles.

BRIEF DESCRIPTION OF DRAWINGS

An embodiment of the invention will now be described, by way of example only, with reference to the accompanying drawings, in which:

FIG. 8 is a fragmentary section on the line A—A of the end of a lens in the cycle rear light of FIG. 2; and FIG. 9 is a fragmentary section on the line B—B of the side of the lens of the cycle rear light of FIG. 2.

DETAILED DESCRIPTION OF PREFERRED EMBODIMENT

Figure 1:
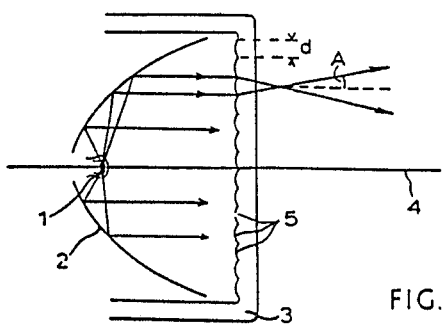
FIG. 1 is a section of a conventional cycle rear light.

The general construction of a conventional front or rear cycle light is illustrated in FIG. 1. A light source 1, which is most commonly a tungsten lamp with compact filament, is sited at a focal point of a reflector 2. The light reflected from 2 passes through a lenticular structure 3 which alters the distribution and angular extent of the output light beam to the desired shape. Almost invariably the reflector 2 is of paraboloidal form so that if the light source 1 is very small the reflected light beam is comprised only of light rays travelling parallel to the reflector optical axis 4. In practice the spread of light from 2 may be as high as 7 degrees owing to the finite size of the lamp filament. It is common for a large part of the light beam leaving the reflector 2 to impinge upon an array of small spherically or cylindrically symmetric lenses within the lenticular structure 3. These lenses are identified by numeral 5 in FIG. 1. A collimated beam of light incident upon a lens 5 will be converted into a beam with semi-angular extent A given by $$A = \text{arc tan } (d/2f) \quad (1)$$

where d is the width or pitch of the lens and f is its focal length. For typical values f=12 mm, d=3 mm and the angle A=7 degrees. Thus it is clear that the distribution of light leaving lens 3 tends to be concentrated near the optical axis 4. For larger angles from the optical axis the output light beam is most often made up from forward-emitted direct light from the lamp and is therefore limited in its intensity by the luminous intensity of the source.

Figure 3:
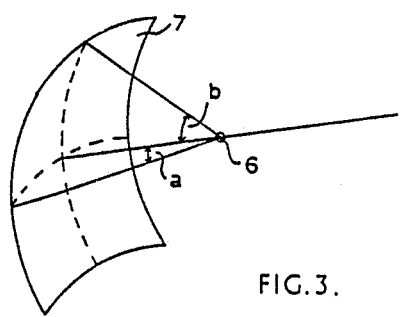
FIG. 3 is a view of the reflector and light source showing the effect of truncation.

FIG. 3 illustrates the truncated form of the reflector when the cross-section of the cycle light is rectangular. The effect of truncating the reflector is to reduce the angular collection of light from the source in one direction with respect to the orthogonal direction. Thus, as shown, the subtense angle b of the reflector 7 with respect to the light source 6 is greater than the similar subtense angle a in the orthogonal direction. For a paraboloidal reflector the truncation results only in a reduction in light collection efficiency and has no practical effect on the angular field of the reflected light. Consequently, in FIG. 1, the angular extent of the light beam leaving the lenses 5 will be the same as when the reflector 2 is not truncated.

Figure 4:
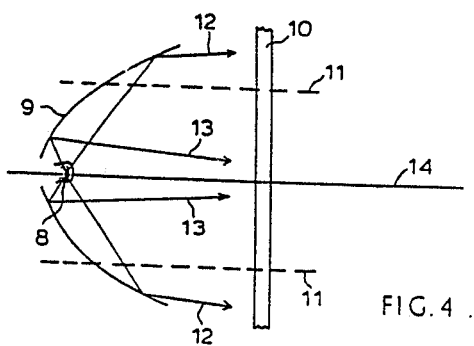
FIG. 4 is a cross-section through a light that contains a reflector designed to produce a diverging beam but that is otherwise conventional.

FIG. 4 is a cross-section through a light which contains a reflector designed to produce a diverging beam of light. Light from the source 8 is formed by the reflector 9 into a diverging beam which impinges upon lens 10 (no detail shown). Should the reflector be truncated so that regions beyond the broken lines 11 are removed, then the marginal rays such as 12 will be removed from the light beam. Unless rays such as 13, which still remain after truncation, diverge in the far field at the same angle with respect to the optical axis 14 as rays 12 then the far field angular divergence of the light beam leaving reflector 9 will be reduced in the plane of truncation.

Unfortunately, it is very common from considerations of the space available for the reflector, its aspect ratio, the optical collection efficiency and the generation of the appropriate distribution of intensity with field angle from the light, for a single reflector curve in which equi-angular extreme field rays such as 12 and 13 exist not to be available. Thus, unless the truncated plane of the reflector corresponds to a direction in which reduced efficiency and angular field coverage is acceptable an alternative solution has to be sought. Although such a solution may be realisable by means of a more complex structure within the lens 10, comprising elements with greater light bending power in one direction compared to the orthogonal direction, it generally leads to a lens design which is a compromise between the requirements of the two directions, and at reduced efficiency, and which has limited appeal as far as industrial styling is concerned.

Figure 2:
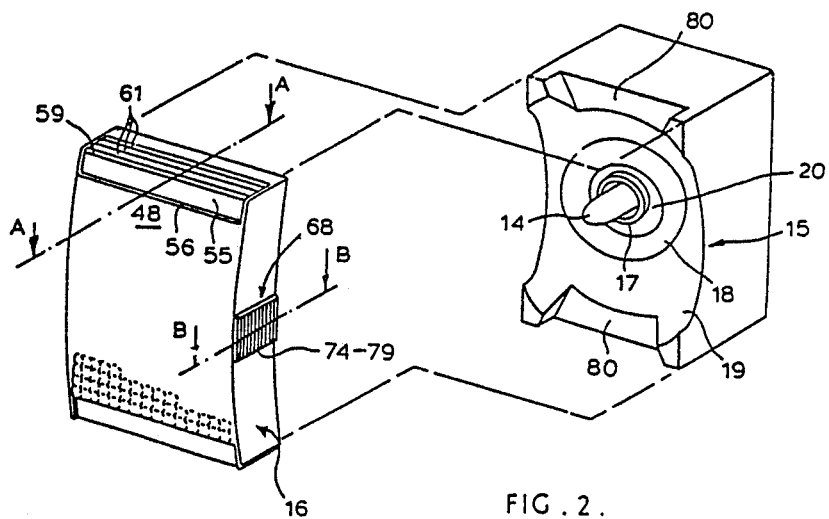
FIG. 2 is a general view of a cycle light according to the invention with the lens removed to reveal the reflector.
Figure 5:
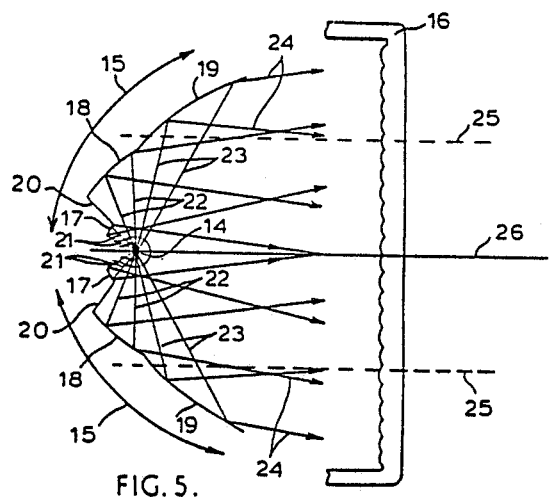
FIG. 5 is a cross-section of the cycle light of FIG. 1 illustrating diagrammatically the way that the reflector, light source and lens cooperate.

FIGS. 2 and 5 illustrate an alternative solution to the problem in the manner of the invention and show a cross-section through a cycle lamp in a plane for which reflector truncation is small or not present. Light from a source 14 is collected by the whole reflector 15 and directed towards a lenticular structure 16. The reflector 15 is comprised of at least two sections of which, firstly, at least one section, which is not the outer section, generates a light beam with far field divergence, and of which, secondly, the sum angular field coverage of all but the outer section and that part of the outer section which is not truncated is equal to the total angular field coverage from all sections of the reflector when all sections of the reflector are present.

In FIGS. 2 and 5 the reflector 15 comprises three sections designated 17, 18 and 19. The sections may be edge-abutting, as between sections 18 and 19, or they may be separated by an intermediate section such as 20, between 17 and 18, which is general subtends an insignificant angle at the light source 14, or they may comprise a combination of the two. The lenticular structure 16 can be identical to that designated as 5 in FIG. 1. At least one of the reflector sections within reflector 15, although not the outer section 19, may be of paraboloidal form. At least one of the reflector sections, e.g. section 17, within reflector 15 may be substantially flat in the plane of FIG. 5. Two or more of the reflector sections within reflector 15 may generate equi-angular field coverage of light. One or more of the reflector sections within reflector 15 may generate a converging output light beam. Thus, for example, the section 17 may, with a compact light source, produce a far field divergence of semi-angle about 3°, the section 18 may produce a far field divergence from about +20° to about −2° depending upon the radial position of the incident light, and the section 19 may produce a far field divergence of semi-angle −20°.

Either all or part of the light leaving reflector 15 may be redistributed angularly by the lens 16 or lens 16 may have no redirectional effect on the light.

Rays designated 21, 22 and 23 are contained within the light from source 14 which impinges on reflector 15. Rays 21 strike reflector section 17; rays 22 strike reflector section 18; and rays 23 strike reflector section 19. In the particular form of the invention shown the light reflected from each of the three sections 17, 18, 19 comprises a diverging beam, with the outer margins of the total output light beam designated by rays 24. When the total light beam impinges upon the lens array within 16 all or part of it is further diverged in the far field approximately according to equation (1).

The cross-section of the cycle light shown in the direction orthogonal to that of FIG. 5 is substantially identical to FIG. 5 except for the outer regions of the figure. Such a cross-section is illustrated in FIG. 5 by the region between the broken lines 25, which may or may not be equally disposed about, and parallel to, the optical axis 26 of the light. The truncation removes all or part of the reflector section 19 and part of the lens array within 16. However, the angular field coverage of the light will be unaffected by the truncation; only the collection efficiency from source 14 and the distribution of intensity over the field will be altered to some degree. This is because there still remains complete angular field coverage via reflector sections 17 and 18 right up to the extreme rays 24 from untruncated reflector section 18. Since the angular field of the light beam emitted from the light is unaffected by the truncation of the reflector the light may operate with substantially equal effect when mounted in either of the two orthogonal directions.

Figure 6:
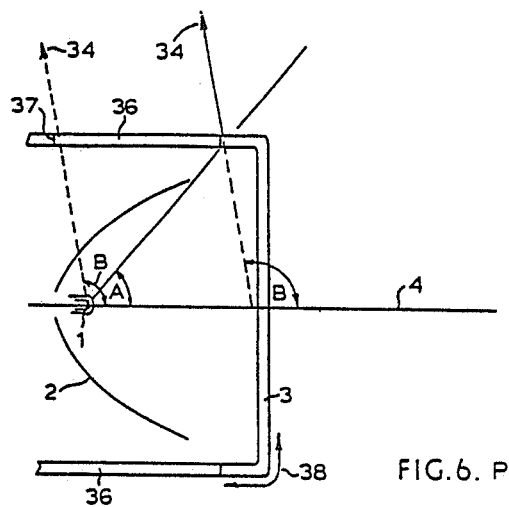
FIG. 6 is a diagrammatic vertical section of an illustrative cycle rear light according to the prior art.
Figure 7:
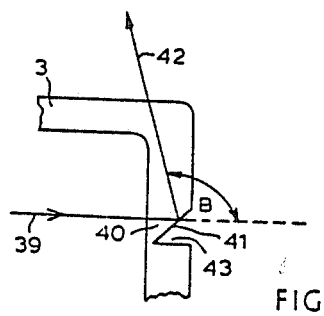
FIG. 7 is a fragmentary section adjacent the side of a lens is a second cycle rear light according to the prior art.

FIGS. 6 to 8 illustrate the provision of rearwardly and upwardly directed light from an end of the lens. FIG. 6 illustrates the layout of a cycle rear light. A compact light source 1 mounted in a reflector 2 illuminates a semi-angular field which extends from the axial direction defined by the optical axis 4 of the reflector 2 (i.e. the backwards direction parallel to the axis of the bicycle) to the extreme vertical or horizontal direction designated by arrowhead 34 in which light returns to the cyclist. In front of the lamp 1 is sited the lens system 3 and shown without detail, which serves in part to convert the light reflected from reflector 2 into a beam of the appropriate intensity/angle distribution. Surrounding the reflector 2 is an optically opaque housing 36 which serves to support all the components as well as batteries if applicable.

Because of the presence of the opaque housing 36 the field of direct light from the light of FIG. 6 is limited to semi-angle A whereas the requirements of the lighting standards may be for a larger semi-angle coverage B. Many cycle rear lights achieve the semi-angle B by both reducing the extent of the opaque housing 36 to finish at 37 and extending the lens 3 to take its place. Then, together with a reflector 2 which is either segmented or truncated in the angular regions where light is required, the lamp filament may be seen from all parts of the field. This solution leads to a design of light which is uniquely different in appearance from a cycle front light and prevents dual usage of many components of the front and rear lights.

Other cycle rear lights incorporate prismatic structures in the outermost regions 38 of the lens 3 to refract and/or reflect light into directions not covered by either the direct light emitted by the lamp filament or the light from the reflector. One difficulty with this approach is the possibility of creating dark areas in the angular field caused by either removing light from these regions in order to illuminate the extreme regions or by light obstruction owing to the prismatic structure itself.

FIG. 7 illustrates the manner in which a cycle rear light with the general layout shown in FIG. 6 may increase its semi-angular field coverage from A to B in this manner. An input light ray, designated by numeral 39, which may either be generated via the reflector 2 (FIG. 6) or directly from the lamp filament 1, strikes a section 40 of the front lens 3. Within section 40 is a recessed flat surface 41 which is inclined to ray 39 at a sufficient angle to ensure that total internal reflection of ray 39 occurs. The reflected ray 42 leaves surface 41 at the required angle B, and by suitably siting surface 41 in the lens 3 (FIG. 6) it can be ensured that ray 42 is not blocked by the opaque housing 36. Clearly, because total internal reflection occurs at surface 41, ray 42 appears essentially of the same luminous intensity as incident ray 39. In practice there will be refraction at either side of the total internal reflection at surface 41 as ray 39 enters and ray 42 leaves the lens 3. The degree of refraction will be dependent on the angles of incidence at the various air/lens interfaces. A particular drawback of the system shown in FIG. 7 is that in use dust and road grime coagulated with water will settle in the recess 43 and reduce the efficiency of reflection at surface 41. Cleaning of such a small recess, particularly if the lens is manufactured as a plastic moulding, can also very easily lead to scratching and reduced efficiency. A further drawback of the system shown in FIG. 7 is that it is not possible to present a smooth or angular indentation-free outer surface to the lens 3 of which section 40 is a part. A yet further and major disadvantage is that owing to the refractive indices of the materials used it is not possible to achieve a deviation angle of more than about 95°.

An improved form of reflective/refractive optical system to generate light beams beyond the extent of direct light from the lamp is illustrated in FIG. 8. Rays 44 to 47 are contained within a spread of direct light from a lamp filament (not shown) or from a portion of the reflector and impinge upon an optically transparent combined prismatic/lenticular structure at the top edge section 48 of the cycle light lens. The edge of an opaque housing 49 extends sufficiently far beyond the lamp to meet edge section 48 that useful direct light from the lamp filament is confined to within the extreme boundary defined by the broken line 50. It is required that light designated by the arrowheads 51 should leave the edge section 48 to provide full coverage from beyond line 50 to ray 52 which is an extension of the ray 44. Lens section 48 contains one or more prismatic sections 53, these being on the back surface 54 of lens 48, which serve to direct part of the input beam of light from the lamp filament to the front surface 55 at such an angle of incidence that total internal reflection (TIR) will occur. Surface 55 may contain a generally obtuse angular step change at 56 in order that the TIR condition is more readily met. The angles of prisms 53 are chosen to either refract light, as shown at surface 57, or to pass light without deviation, as shown at surface 58, as necessary for TIR to occur. Light reflected at surface 55 travels through the medium of lens section 48 until it impinges upon a lenticular edge structure 59 which acts so as to spread, in the far field, the beam of light which strikes it. Light that has left structure 59 is designated by some of the arrowheads which comprise 51 and is directed over an angular range which extends beyond the boundary 50 up to the required extreme angle defined by the line 62.

The output light distribution which is ultimately generated by the beam containing rays 44 and 45 is supplemented by a second output beam of light of which rays 46 and 47 form part of the input. This light passes through surface 54 without significant deviation and impinges upon a second lenticular structure 61 adjacent to 59. The lenses within structure 61 act so as to spread the incident light over a range which extends from at least the boundary defined by 52 to at least overlap the beam emitted from 59. In this way there is continuous coverage to the extreme boundary designated by the line 62. The ends of the reflector 15 are cut away at 80 (FIG. 2) to allow rays 46, 47 to pass direct to the structure 61.

By careful design of the optical system parameters it can be ensured that all the light leaving structure 59 is sited significantly far above the root 60 so as not to be affected by dust and dirt, and likewise for array 61, although these lenses may not be of high numerical aperture and therefore so bulbous as lens 59. The action of structure 59 and array 61 is not unduly harmed by rain which simply forms drops that further diffuse the light.

Lens 59 and array 61 may alternatively be sited on the inner surface 54 of lens section 48. Should this be the case then the outer surface 55 of lens 48 will be resistant to the effects of dust and water.

The lenses of array 61 may be of spherical form. Alternatively they may be cylindrical, in which case a further lenticular array 63, similar to 61 and aligned perpendicular to it, must be sited on the surface 54, in order that light spreading in a plane perpendicular to FIG. 3 will be assured.

Referring now to FIG. 2, it may be noted that the ends of the lens 3 are symmetrical so that some light is distributed forwardly above and below the lens. Similarly, if the light is mounted so that its major direction is horizontal, light emerges through lens 59 and array 61 as a sideways cone, which enables the light to be mounted at will to either side of the bicycle.

As has been described above, the reflector is truncated at sides 69 thereof and the lens 3 is formed with distributing regions 68 that serve in the normal vertical mounting attitude to create horizontal sideways light beams to increase visibility. The regions 68 contain prismatic arrays that deviate light over a greater range than a lens system and operate with direct light from the source.

A typical refractive prismatic array is illustrated in FIG. 9. A series of substantially flat surfaces 74 to 79 are inclined at incrementally increasing angles to the light emanating from a compact filament source (not shown). The surfaces 74 to 79 are linked together by scarp surfaces of the array which are designed to intercept as little as possible of the input light beam. Light which is refracted by the surfaces is further refracted by the plane surface 80 opposite the prismatic array so that light leaves 80 with a substantially increased angular spread compared to the input beam. It is preferable that the tips of the array, such as that at 81, are curved. In this way, the tendency of the discrete surfaces 74 to 79 to produce a series of stripes in the output beam is removed because the tip radii cause smearing of light between the stripes.

What is claimed is:

1. A light comprising a lamp, means defining an optical axis close to which the major part of the emergent light is distributed and a lens system having formed on its nearer face to the lamp one or more prisms adjacent an edge thereof and being arranged to trap direct light from the lamp and distribute it by total internal reflection through the material of said lens system so that it emerges from the edge at more than 100° to the optical axis.

2. A light according to claim 1, wherein the minimum angle of incidence $i_{min}$ of direct light from the lamp on the face of the or each prism at which said direct light is refracted into said material is given by:

$$\sin i_{min} = n \sin [\phi_c - \theta]$$

where n is the refractive index of said material, $\phi_c$ is the critical angle for total internal reflection and $\theta$ is the angle between the incident face and the face at which total internal reflection occurs.

3. A light according to claim 1, wherein the lens system may be cylindrically convex over its major part when viewed from in front of the light and an edge region bounding said major part is formed with scarp and dip faces meeting at an obtuse angulation, the dip face receiving the incident totally internally reflected light.

4. A light according to claim 1, wherein a plurality of said prisms is located adjacent said edge, and the edge at which said light emerges is of convex profile so that light emerges at a range of angels.

* * * * *